US012574951B2

(12) United States Patent
Sandberg et al.

(10) Patent No.: US 12,574,951 B2
(45) Date of Patent: Mar. 10, 2026

(54) METHOD AND A NETWORK NODE FOR REDUCING IMPACT OF INTERFERENCE

(71) Applicant: Telefonaktiebolaget LM Ericsson (publ), Stockholm (SE)

(72) Inventors: Sara Sandberg, Luleå (SE); Arne Simonsson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 662 days.

(21) Appl. No.: 17/918,250

(22) PCT Filed: Apr. 15, 2020

(86) PCT No.: PCT/SE2020/050385
§ 371 (c)(1),
(2) Date: Oct. 11, 2022

(87) PCT Pub. No.: WO2021/211024
PCT Pub. Date: Oct. 21, 2021

(65) Prior Publication Data
US 2023/0142158 A1     May 11, 2023

(51) Int. Cl.
*H04W 72/54* (2023.01)
*H04L 5/14* (2006.01)
(Continued)

(52) U.S. Cl.
CPC .............. *H04W 72/54* (2023.01); *H04L 5/14* (2013.01); *H04W 16/28* (2013.01); *H04W 72/0446* (2013.01)

(58) Field of Classification Search
CPC . H04W 72/54; H04W 16/28; H04W 72/0446; H04W 72/27; H04L 5/14
See application file for complete search history.

(56) References Cited

U.S. PATENT DOCUMENTS

2013/0121189 A1* 5/2013 Bhattad ................. H04L 5/1484
                                                        370/252
2015/0358978 A1* 12/2015 Lin ........................ H04W 72/20
                                                        370/280
(Continued)

FOREIGN PATENT DOCUMENTS

EP           3567760 A1 * 11/2019 ............. H04B 15/00

OTHER PUBLICATIONS

International Search Report and Written Opinion dated Dec. 16, 2020 for International Application No. PCT/SE2020/050385 filed Apr. 15, 2020; consisting of 14 pages.

*Primary Examiner* — Chae S Lee
(74) *Attorney, Agent, or Firm* — Weisberg I.P. Law, P.A.

(57)           ABSTRACT

A method, network node and computer storage medium for reducing the impact of interference in a cell from at least another neighbouring cell. The cell operates using a time division duplex, TDD, configuration, and the neighbouring cell operating using another TDD configuration. The TDD configurations are divided into different time units for at least downlink, DL, and uplink, UL, transmissions. The method includes identifying time units in the TDD configuration. The identification of a time unit is based on whether the time unit has a different configuration compared to the time unit in the another TDD configuration used in the neighbouring cell. The method further includes defining a restricted TDD configuration for use in the cell, where the restricted TDD configuration excludes transmission in the identified time units. The method further includes identifying a physical direction in which to apply the restricted TDD configuration.

18 Claims, 11 Drawing Sheets

(51) Int. Cl.
_H04W 16/28_        (2009.01)
_H04W 72/0446_        (2023.01)

(56)                    References Cited

U.S. PATENT DOCUMENTS

| 2019/0098626 | A1* | 3/2019 | Yi | ......................... | H04W 72/12 |
| 2020/0008087 | A1* | 1/2020 | Papaleo | ............... | H04W 72/542 |
| 2020/0084766 | A1 | 3/2020 | Pawlak et al. | | |
| 2022/0060265 | A1* | 2/2022 | Xu | ........................ | H04L 5/0094 |

* cited by examiner

601 Identifying time units in the TDD configuration

602 Define a restricted TDD configuration

603 Identify a physical direction in which to apply the restricted TDD configuration

METHOD AND A NETWORK NODE FOR REDUCING IMPACT OF INTERFERENCE

CROSS-REFERENCE TO RELATED APPLICATION

This application is a Submission Under 35 U.S.C. § 371 for U.S. National Stage Patent Application of International Application Number: PCT/SE2020/050385, filed Apr. 15, 2020 entitled "A METHOD AND A NETWORK NODE FOR REDUCING IMPACT OF INTERFERENCE," the entirety of which is incorporated herein by reference.

Embodiments presented herein relate to a method for a network node, a network node, a computer program, and a computer program product for reducing the impact of interference from at least another wireless device operating in a neighbouring cell using another TDD configuration.

BACKGROUND

The 5G NR (New Radio) is the latest in the series of 3GPP cellular standards which supports very high data rate and with lower latency compared to its predecessor LTE (4G) and 3G/2G technology.

Transmission and reception from a node, e.g., a terminal or user equipment (UE) and base station in a cellular standard such as NR or LTE, may be multiplexed in the frequency domain or in the time domain (or combinations thereof). Frequency Division Duplex (FDD) as illustrated to the left in FIG. 1 implies that downlink (DL) and uplink (UL) transmission take place in different, sufficiently separated, frequency bands. Time Division Duplex (TDD), as illustrated to the right in FIG. 1, implies that downlink and uplink transmission take place in different, non-overlapping time slots. Thus, TDD can operate in unpaired spectrum, whereas FDD requires paired spectrum.

In LTE as well as NR, neighboring cells typically have the same uplink-downlink configuration to avoid severe interference between uplink and downlink transmissions. This makes it difficult to dynamically change uplink-downlink configuration according to current traffic patterns.

Networks of different operators in the same area may be operated in adjacent frequencies. Due to independent UL power control among different cells and different operators, the transmit power of UEs from different operators cannot be controlled, which could result in severe interference when the UEs have large path losses to their serving base stations and large transmit powers are used to compensate for the path losses. For example, the spectrum mask required adjacent channel suppression (often in the order of 30-40 dB compared to the transmit power) is smaller than the path loss difference between the other operators UE and own base station. This implies that for example two UEs belonging to people travelling with the same bus and using different operator networks operated on adjacent frequencies may cause significant interference to each other. If the operator networks use different TDD uplink-downlink configurations, the amount of so-called cross-link interference can be substantial.

To enable coexistence with reasonable power and spectrum constrains, the government agency for IT and telecommunications in some countries, such as Post och Telestyrelsen in Sweden (PTS), have specified a fixed TDD pattern. For a new NR sub-6 spectrum in Australia, ACMA specify operator synchronization and a fixed TDD pattern matching LTE config 1. The potential spectrum utilization improvement that could be achieved with dynamic TDD is then not utilized.

If neighboring cells or operators with adjacent frequency bands are allowed to have different uplink-downlink configurations, there may be several cases of severe cross-link interference. For example, a UE on the cell edge receiving downlink may be significantly interfered by a nearby UE simultaneously transmitting in uplink to a neighboring base station with a different uplink-downlink configuration, as shown in FIG. 2. FIG. 2 shows a network node and a wireless device operating in one cell using a TDD configuration (TDD configuration A), and another network node and another wireless device operating in another neighboring cell using another TDD configuration (TDD configuration B). There may be interference, crosslink interference between the network nodes and between the wireless devices because they operate in the neighboring cells operating using different TDD configurations.

Even though the channel is changing slowly, interference may vary quickly in a slot-periodic pattern depending on the uplink-downlink configurations selected for adjacent cells. Adjacent cells operated by the same operator typically use the same frequency band and cross-link interference in the case of different uplink-downlink configurations may be severe, especially on the cell-edge. Adjacent cells operated by different operators on adjacent frequency bands and using different TDD configurations may experience less cross-link interference due to the spectrum mask required adjacent channel suppression. However, adjacent cells operated by different operators may be overlapping almost completely geographically (they may even use the same tower for their antennas) and the cross-link interference problem will therefore typically be significant in all parts of the cell, not only on the cell-edge.

The level of the interference in the UL-DL colliding sub-frames or slots will depend on UE individual position both for the co-channel case (adjacent cells) and the adjacent channel case (e.g. different operators). If UEs are well separated there will not be any significant interference, especially for the adjacent channel case where adjacent channel suppression is applied.

Cross-link interference (CLI) from a UE transmitting in uplink to a nearby UE in an adjacent cell that is trying to receive a downlink transmission is one example. Another example of significant cross-link interference is downlink transmission in one cell, where the UE is in the direction of a neighboring base station, which may be interfered by the downlink transmission while receiving uplink transmission from a UE in its own cell. In this case it is beam/antenna direction as well as receiver combining ("receive beam direction") that is relevant rather than the exact location of the UEs.

If the operators' networks are not synchronized and use different TDD pattern configurations, the interference can differ periodically between different subframes or slots.

SUMMARY

According to one aspect, a method in a network node is provided. The method is performed in network node for reducing the impact of interference in a cell from at least another neighbouring cell. The cell operates using a time division duplex, TDD, configuration, and the neighbouring cell operating using another TDD configuration. The TDD configurations are divided into different time units for at least downlink, DL, and uplink, UL, transmissions. The method includes identifying time units in the TDD configuration. The identification of a time unit is based on whether the time unit has a different configuration compared to the time unit in the another TDD configuration used in the neighbouring cell. The method further includes defining a restricted TDD configuration for use in the cell, where the restricted TDD configuration excludes transmission in the identified time units. Furthermore, the method further includes identifying a physical direction in which to apply the restricted TDD configuration.

According to another aspect, a network node is provided. The network node is configured to reduce the impact of interference in a cell from at least another neighbouring cell. The cell configured to operate using a time division duplex, TDD, configuration, and the neighbouring cell configured to operate using another TDD configuration. The TDD configurations are divided into different time units for at least downlink, DL, and uplink, UL, transmissions. The network node includes a processor and a memory for storing program code that is executed by the processor to perform operations including identify time units in the TDD configuration. The identification of a time unit is based on whether the time unit has a different configuration compared to the time unit in the another TDD configuration used in the neighbouring cell. The operations further include define a restricted TDD configuration for use in the cell, where the restricted TDD configuration excludes transmission in the identified time units. Furthermore, the operations include identify a physical direction in which to apply the restricted TDD configuration.

According to another aspect, a computer program is provided. The computer program reduces the impact of interference in a cell from at least another neighbouring cell. The computer program reduces the impact of interference in a cell from at least another neighbouring cell. The cell operating using a time division duplex, TDD, configuration, and the neighbouring cell operating using another TDD configuration. The TDD configurations are divided into different time units for at least downlink, DL, and uplink, UL, transmissions. The computer program comprising computer code which, when run on processing circuitry causes the network node to identify time units in the TDD configuration. The identification of a time unit is based on whether the time unit has a different configuration compared to the time unit in the another TDD configuration used in the neighbouring cell. The computer program further causes the network node to further include define a restricted TDD configuration for use in the cell, where the restricted TDD configuration excludes transmission in the identified time units. Furthermore, the computer program causes the network node to identify a physical direction in which to apply the restricted TDD configuration. [To be filled out]

The main advantage of the embodiments disclosed herein is that the CLI can be reduced by applying a restricted TDD pattern. The restricted TDD pattern may be used in geographical areas where multiple radio network co-exist, such as areas where a local industry area network overlaps with a nationwide radio network. The solution allows a nationwide area downlink heavy network, typically configured to use operator-owned spectrum, and a local area uplink heavy industry network to share spectrum. Thereby, even if local spectrum already exists for the industrial area network, the operator spectrum can be used to boost the performance of the local industrial area network.

Public operator phones using for example MBB operator subscription with nationwide coverage can be used with improved quality and reduced interference in industry area where another network is used. This will enhance the services for visiting users not connected to the local industry area network.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 3:
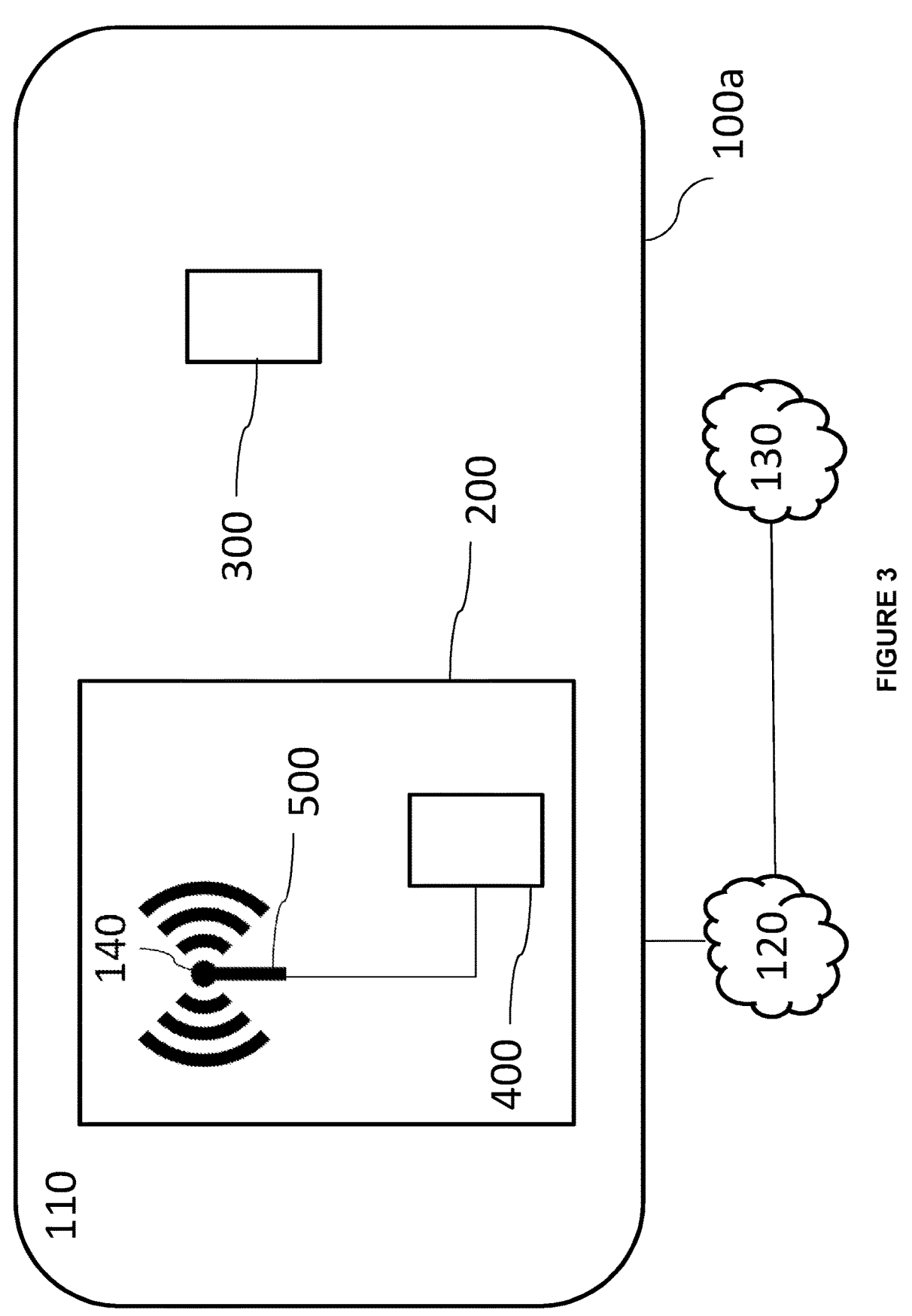
FIG. 3 is a schematic diagram illustrating communications networks according to embodiments.

FIG. 3 is a schematic diagram illustrating a communications network 100a where embodiments presented herein can be applied. The communications network 100a could be a third generation (3G) telecommunications network, a fourth generation (4G) telecommunications network, or a fifth (5G) telecommunications network and support any 3GPP telecommunications standard.

The communications network 100a comprises a transmission point, TP, 140 including an antenna device 500 which may be a Multiple-Input Multiple-Output (MIMO) antenna including two or more antennas. The antenna device 500 is connected to a radio device 400. The communications network 100a further includes the network node 200, which may include one or more TPs. The network node is configured to, in a radio access network 110, provide network access to a user equipment (UE) 300. The radio access network 110 is operatively connected to a core network 120.

Figure 4:
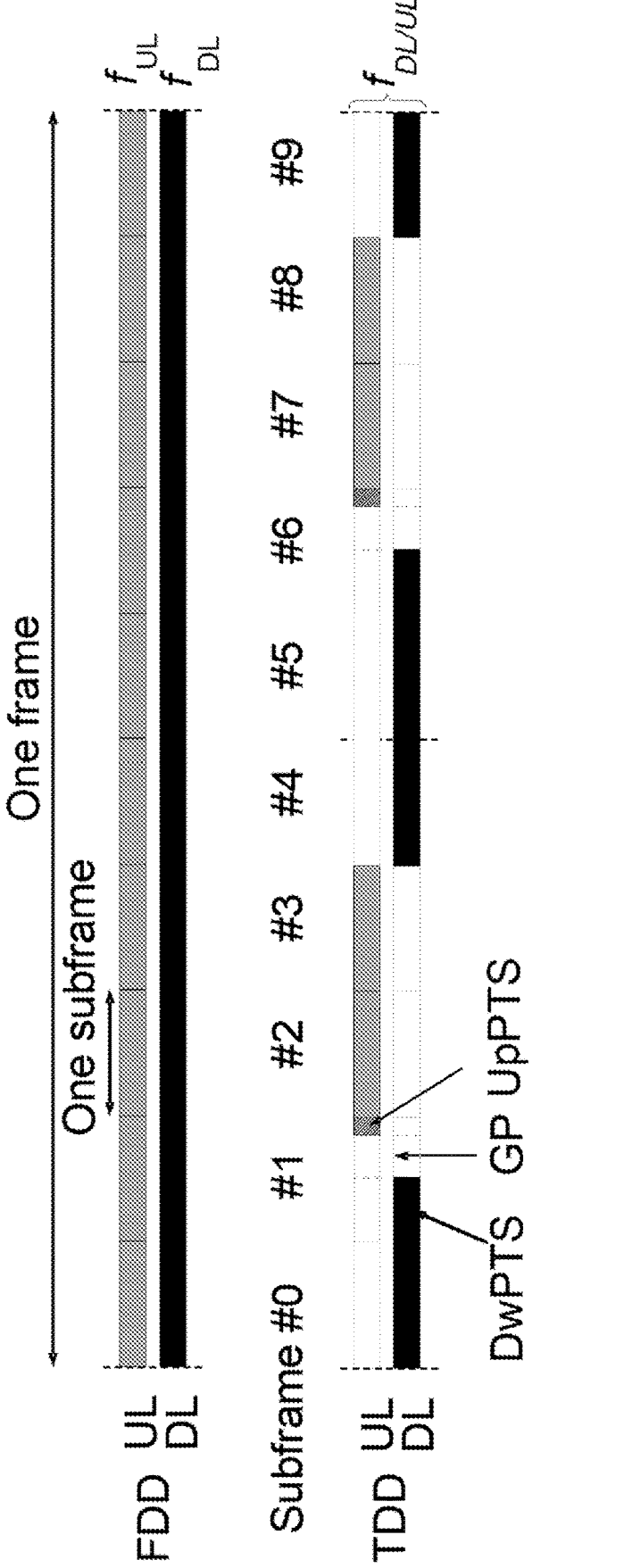
FIG. 4 shows downlink part (DwPTS), a guard period (GP), and an uplink part (UpPTS) of a TDD configuration.

The core network 120 is in turn operatively connected to a service network 130, such as the Internet. The UE 300 is thereby, via network node and the transmission point 140, enabled to access services of, and exchange data with, the service network 130. Examples of network nodes are radio access network nodes, radio base stations, base transceiver stations, Node Bs, evolved Node Bs, g Node Bs, gNBs, access points, access nodes, antenna integrated radios (AIRs), and transmission and reception points (TRPs). A UE may also be referred to as a wireless device. Other examples of UEs are terminal devices, mobile stations, mobile phones, handsets, wireless local loop phones, smartphones, laptop computers, tablet computers, network equipped sensors, network equipped vehicles, and so-called Internet of Things devices. Typically, the structure of the transmitted signal in a communication system is organized in the form of a frame structure. For example, LTE uses ten equally-sized subframes of length 1 ms per radio frame as illustrated in FIG. 4.

LTE and NR use Orthogonal Frequency Division Multiplexing (OFDM) in the downlink direction and a Discrete Fourier Transform (DFT)-spread OFDM in the uplink direction. NR also support OFDM in uplink. The basic LTE downlink physical resource can thus be seen as a time-frequency grid, where each resource element corresponds to one OFDM subcarrier during one OFDM symbol interval. In the time domain, LTE downlink transmissions may be organized into radio frames of 10 ms, with each radio frame consisting of ten equally-sized subframes of length Tsubframe=1 ms.

Sidelink is the special kind of communication mechanism between device and device without going through a base station such as an eNB or a gNB. Sidelink enables device-to-device (D2D) communication.

Furthermore, the resource allocation in LTE is typically described in terms of resource blocks, where a resource block corresponds to one slot, e.g., 0.5 ms, in the time domain and 12 subcarriers in the frequency domain. A pair of two adjacent resource blocks in time direction, e.g., 1.0 ms, is known as a resource block pair. Resource blocks are numbered in the frequency domain, starting with 0 from one end of the system bandwidth.

NR terminology and LTE terminology coincide to a considerable extent; for instance, a resource element (RE) remains 1 subcarrier×1 OFDM symbol. Yet some terms known in LTE have been given a new meaning in NR. This disclosure, including the claims, applies prefixes "LTE" and "NR" when indefiniteness could otherwise arise.

Any term designating an object or operation known from LTE is expected to be reinterpreted functionally in view of NR specifications. Examples: An LTE radio frame may be functionally equivalent to an NR frame, considering that both have a duration of 10 ms. An LTE eNB may be functionally equivalent to an NR gNB, since their functionalities as downlink transmitter are at least partially overlapping. The least schedulable resource unit in LTE may be reinterpreted as the least schedulable resource unit in NR. The shortest data set for which LTE acknowledgement feedback is possible may be reinterpreted as the shortest data set for which NR acknowledgement feedback is possible.

Therefore, even though some embodiments of this disclosure have been described using LTE-originated terminology or NR-originated terminology, they remain fully applicable to NR technology or LTE technology, respectively. Further throughout the embodiments the term subframe is completely interchangeable with the term slot.

Figure 1:
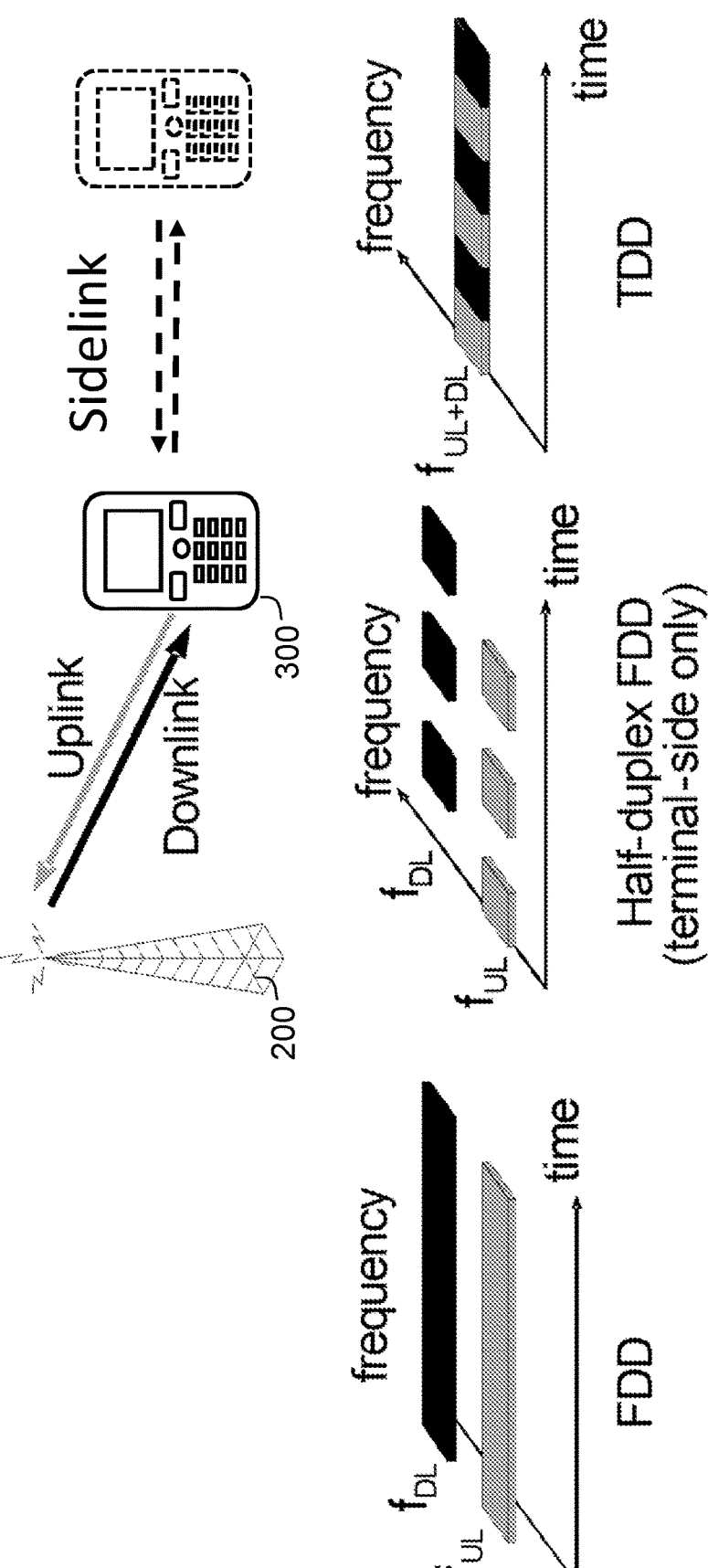
FIG. 1 illustratively shows downlink and uplink communication in FDD, TDD and half-duplex operations, and sidelink communication.
Figure 2:
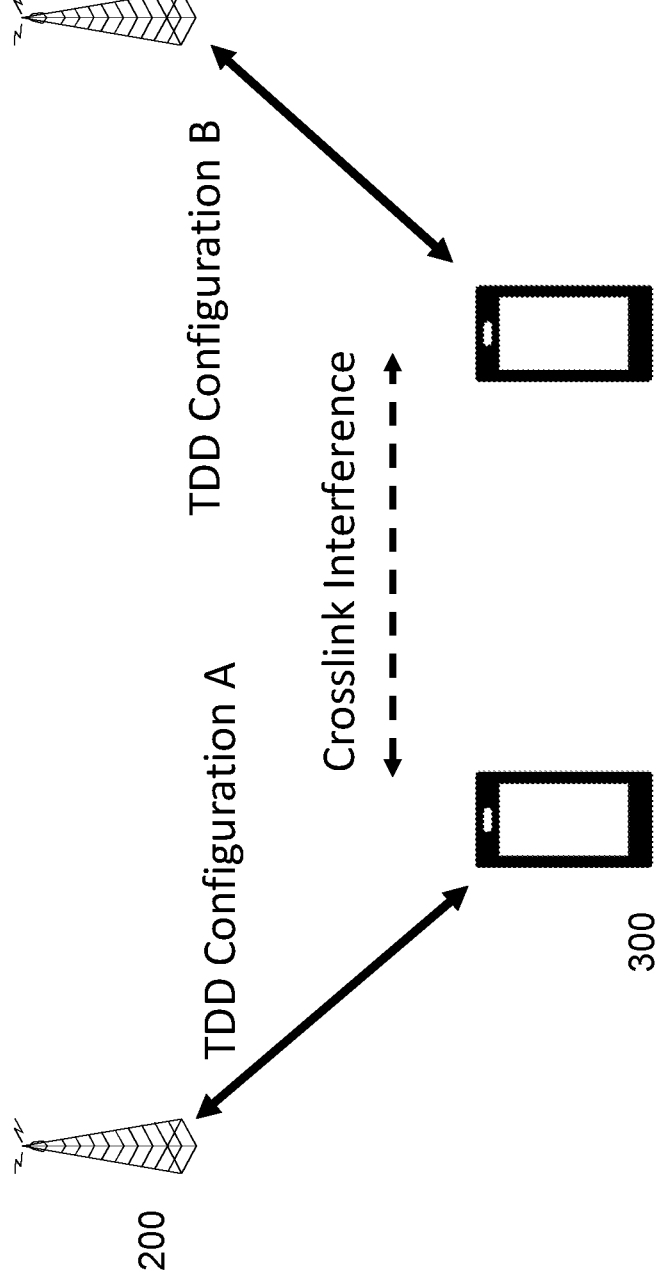
FIG. 2 illustratively shows cross-link interference between two UEs belonging to different cells that using different uplink-downlink configurations.

In case of FDD operation, illustrated in the left part of FIG. 1, there are two carrier frequencies, one for uplink transmission (fUL) and one for downlink transmission (fDL). At least with respect to the terminal in a cellular communication system, FDD may be either full duplex or half duplex. In the full duplex case, a terminal may transmit and receive simultaneously, while in half-duplex operation, the terminal may not transmit and receive simultaneously. The base station is capable of simultaneous reception/transmission though, e.g., receiving from one terminal while simultaneously transmitting to another terminal. In LTE, a half-duplex terminal is monitoring/receiving in the downlink except when explicitly being instructed to transmit in a certain subframe.

In case of TDD operation, illustrated in the right part of FIG. 1, there is only a single carrier frequency and uplink and downlink transmissions are always separated in time also on a cell basis. As the same carrier frequency is used for uplink and downlink transmission, both the base station and the mobile terminals need to switch from transmission to reception and vice versa. An aspect of any TDD system is to provide the possibility for a sufficiently large guard time where neither downlink nor uplink transmissions occur. This is required to avoid interference between uplink and downlink transmissions. For LTE, this guard time is provided by special subframes, e.g., subframe 1 and, in some cases, subframe 6 of a frame, which are split into three parts: a downlink part (DwPTS), a guard period (GP), and an uplink part (UpPTS), as illustratively shown in FIG. 4. The remaining subframes are either allocated to uplink or downlink transmission.

TDD allows for different asymmetries in terms of the amount of resources allocated for uplink and downlink transmission, respectively, by means of different uplink-downlink configurations. In LTE, there are seven different TDD configurations, as shown in Table 1. It should be appreciated that a DL subframe may mean either DL or the special subframe.

In TDD, some subframes/slots/symbols are allocated for uplink (U in table 1) transmissions and some subframes/slots/symbols are allocated for downlink transmissions (D in table 1). The switch between downlink and uplink occurs in the so called special subframes (LTE, S in table 1) or flexible subframes (NR).

TABLE 1

LTE uplink-downlink configurations (from 36.211, Table 4.2-2)

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period (and hence the number of symbols for DwPTS and UwPTS in the special subframe) can also be configured from a set of possible selections.

NR on the other hand provides many different uplink-downlink configurations. There are 10 to 320 slots per radio frame (where each radio frame has a duration of 10 ms)

depending on subcarrier spacing. Each slot can be config-ured with a slot format as shown in Table 2. The OFDM symbols in a slot are classified as 'downlink' (denoted 'D' in Table 2), 'flexible' (denoted 'X'), or 'uplink' (denoted 'U'), if dynamic Slot Format Indication (SFI) is used where the format of a slot is indicated with DCI Format 2_0. As an alternative to this, a semi-static TDD UL-DL configuration may be used where the TDD configuration is RRC config-ured using the IE TDD-UL-DL-ConfigCommon:

```
TDD-UL-DL-ConfigCommon ::=   SEQUENCE {
   -- Reference SCS used to determine the time domain boundaries in the UL-DL
pattern which must be common across all subcarrier specific
   -- virtual carriers, i.e., independent of the actual subcarrier spacing using for
data transmission.
   -- Only the values 15 or 30 kHz (<6GHz), 60 or 120 kHz (>6GHz) are applicable.
   -- Corresponds to L1 parameter 'reference SCS' (see 38.211, section FFS__Section)
   referenceSubcarrierSpacing          SubcarrierSpacing
   OPTIONAL,
   -- Periodicity of the DL-UL pattern. Corresponds to L1 parameter 'DL-UL-
transmission-periodicity' (see 38.211, section FFS__Section)
   dl-UL-TransmissionPeriodicity       ENUMERATED {ms0p5, ms0p625, ms1, ms1p25, ms2,
ms2p5, ms5, ms10}                      OPTIONAL,
   -- Number of consecutive full DL slots at the beginning of each DL-UL pattern.
   -- Corresponds to L1 parameter 'number-of-DL-slots' (see 38.211, Table 4.3.2-1)
   nrofDownlinkSlots                   INTEGER (0..maxNrofSlots)
   OPTIONAL,
   -- Number of consecutive DL symbols in the beginning of the slot following the
last full DL slot (as derived from nrofDownlinkSlots).
   -- If the field is absent or released, there is no partial-downlink slot.
   -- Corresponds to L1 parameter 'number-of-DL-symbols-common' (see 38.211, section
FFS__Section).
   nrofDownlinkSymbols                 INTEGER (0..maxNrofSymbols−1)    OPTIONAL,    -
- Need R
   -- Number of consecutive full UL slots at the end of each DL-UL pattern.
   -- Corresponds to L1 parameter 'number-of-UL-slots' (see 38.211, Table 4.3.2-1)
   nrofUplinkSlots                     INTEGER (0..maxNrofSlots)       OPTIONAL,
   -- Number of consecutive UL symbols in the end of the slot preceding the first
full UL slot (as derived from nrofUplinkSlots).
   -- If the field is absent or released, there is no partial-uplink slot.
   -- Corresponds to L1 parameter 'number-of-UL-symbols-common' (see 38.211, section
FFS__Section).
   nrofUplinkSymbols                   INTEGER (0..maxNrofSymbols−1)OPTIONAL    --
Need R
```

That is, the number of UL and DL slots, as well as the guard period (the number of UL and DL symbols in the flexible slot(s)) may be almost arbitrarily configured within the TDD periodicity. This allows for very flexible uplink-downlink configurations.

TABLE 2-continued

NR slot formats (from 38.211, Table 4.3.2-3)

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |

TABLE 2

NR slot formats (from 38.211, Table 4.3.2-3)

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |

TABLE 2-continued

NR slot formats (from 38.211, Table 4.3.2-3)

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |

9

TABLE 2-continued

NR slot formats (from 38.211, Table 4.3.2-3)

| For-mat | Symbol number in a slot | | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | D | D | X | X | X |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | X | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | X | X | U | U | D | D | D | X | X | U | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |
| 62-255 | Reserved | | | | | | | | | | | | | |

In LTE the TDD configuration is defined per subframe and in NR the TDD configuration is defined per symbol. In the embodiments different time units such as subframes, slots and symbols are being used to describe the TDD configuration. The embodiments are, however, not limited to the time units used in the embodiment. The embodiments can be applied using any time unit.

Further, throughout the embodiments the term TDD configuration is completely interchangeable with the term TDD pattern.

To avoid severe interference between downlink and uplink transmissions between different cells, neighbouring cells should have the same downlink/uplink configuration. If this is not done, uplink transmission in one cell may interfere with downlink transmission in the neighboring cell and vice versa.

In reconfigurable TDD systems, the TDD configuration may be changed depending on traffic demands on a cell-by-cell basis. As a result, two neighboring base stations may use respective different resource allocations for UL and DL, which may result in DL-to-UL interference, i.e., transmitting base station to receiving base station interference. DL-to-UL interference, will be referred to herein as cross-link interference (CLI), occurs when one base station, referred to herein as a base station, is transmitting on the DL, while a second base station is receiving transmissions from a UE in the UL. The different resource allocations result in interference.

Figure 5:
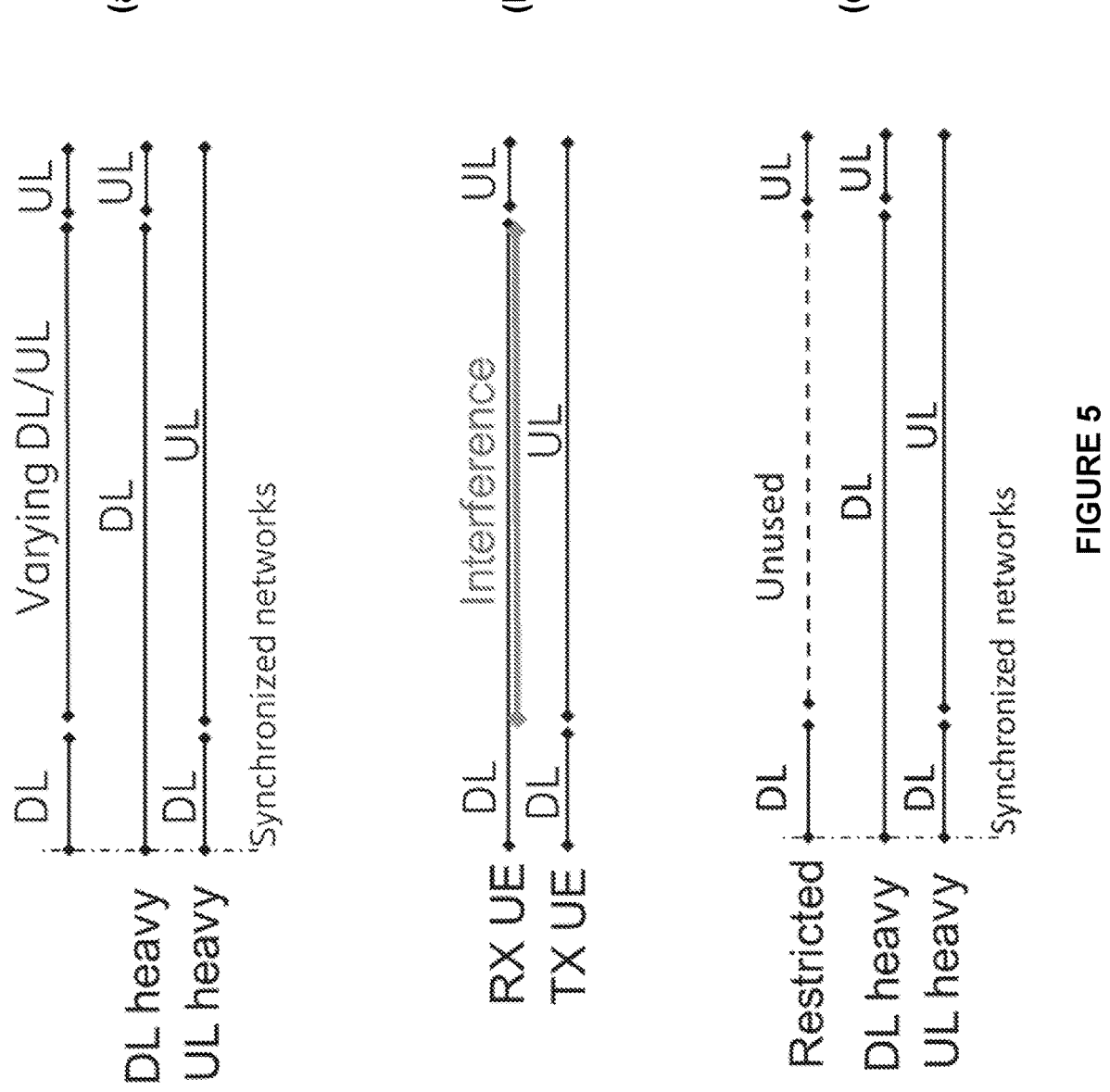
FIG. 5 is a schematic illustration showing which time-units in a TDD configuration that are subject to cross-link interference (a), (b), and how the cross-link interference is avoided by introducing unused time-units (c)

FIG. 5 illustratively shows the TDD configurations of two neighbouring cells. It is assumed that the cells are synchronized. If the cells belong to different networks it is assumed that the networks are synchronized. The synchronization may include that the TDD configuration in the cell and the another TDD configuration in the neighbouring cell are synchronized in time. The frame timing and/or the subframe or slot timing of the cells may be synchronized.

In FIG. 5a, one of the UEs has a TDD configuration that is more 'downlink heavy'. The definition of 'downlink heavy' is that the TDD configuration has more subframes or slots available for DL. 'Uplink heavy' is defined by TDD configurations having more subframes or slots available for UL. As can be seen from FIG. 5a, subframes or slots where one cell is configured for uplink and the other cell is configured for downlink, or vice versa, are referred to as varying subframes or slots. Subframes or slots where one cell is configured for uplink and the other cell is also configured for uplink, both cells may also be configured for downlink, are referred to as fixed subframes or slots. CLI mainly occurs in the varying subframes or slots as both cells/networks transmit in the same direction in the fixed subframes or slots.

If two UEs belong to different cells that are in turn scheduled with different uplink-downlink configurations and are near each other as illustrated in FIG. 4, the UE with more DL slots, referred to as Rx UE, will experience interference on the varying slots used for downlink. The UE with more UL slots, referred to as Tx UE, may experience less crosslink interference compared to the Rx UE. This is illustratively shown in FIG. 5b, where it is assumed that the neighbouring UEs are so close that they may experience CLI and other interferences due to their proximity to each other.

In the embodiments a restricted TDD configuration is used to avoid CLI, see FIG. 5c. In a restricted TDD configuration only DL and UL slots common for different cells are being used for transmitting data, i.e. only the fixed subframes or slots are being used for data transmission. Further, in a restricted TDD configuration the slots for which neighbouring cells have different UL or DL configurations, i.e. varying slots where CLI is most likely, will be not be used for data transmission. In restricted TDD configurations the varying symbols/slots/subframes are unused i.e. no control data or no data is transmitted in the unused symbols/slots/subframes because this symbols/slots/subframes are the ones most likely to experience CLI.

In some embodiments the restricted TDD configuration is applied only into certain directions. For example, if UE is initially covered by a mobile broadband network (MBB) and then moves to a smaller local network such as an industry area network then the UE is initially covered by a larger cell, i.e. the MBB, and then it is covered by another smaller cell, i.e. the industry area network. The MBB may use one TDD configuration and the industry area network work may use a another TDD configuration. The MBB and the industry area network are covered by neighbouring cells and therefore the UE, after transitioning into the industry area, may experience CLI. In the industry area the UE may use the restricted TDD configuration such that no control data or information data is transmitted during varying time units. The network node of the MBB cell may utilise the restricted TDD configuration for the beam or beams that cover the geographical area or location overlapping with the industry area network and may use other TDD configure for other beam or beams covering other geographical areas or locations.

When a network node, e.g. a gNB, communicates with numerous wireless devices using different beams for different wireless devices, every beam is directional and covers only specific physical direction. The directional beams may be achieved using beamforming. Beamforming technique focuses the radiofrequency, RF, energy into a narrow direction to allow the RF beam to propagate farther in a physical direction. Thus, in order to ensure that the UE has continuous, seamless coverage, multiple beams in as many different directions as possible may be available. The network transmits different beams in different spatial directions. The UE listens/scans for the beam transmissions from the gNB in different receive spatial directions. Based on the performed beam sweeps, the UE determines a channel quality associated with the performed beam sweeps. Then the UE sends the channel quality information to the gNB.

In some embodiments the direction or beams where the restricted TDD pattern is used may be:

Specific beams, such as a subset of beams in a grid-of-beams (GoB)

Angular transmission direction, such as horizontal and/or vertical main gain direction of free form beams from reciprocity-based beamforming Sectors angles, such as horizontal and/or vertical ranges of GoB or free form beams If needed, a whole sector may use the restricted TDD pattern.

In some further embodiments the direction can be manually configured or automatically detected based on detected interference or communication failures, e.g. using machine learning or artificial intelligence.

Figure 6:
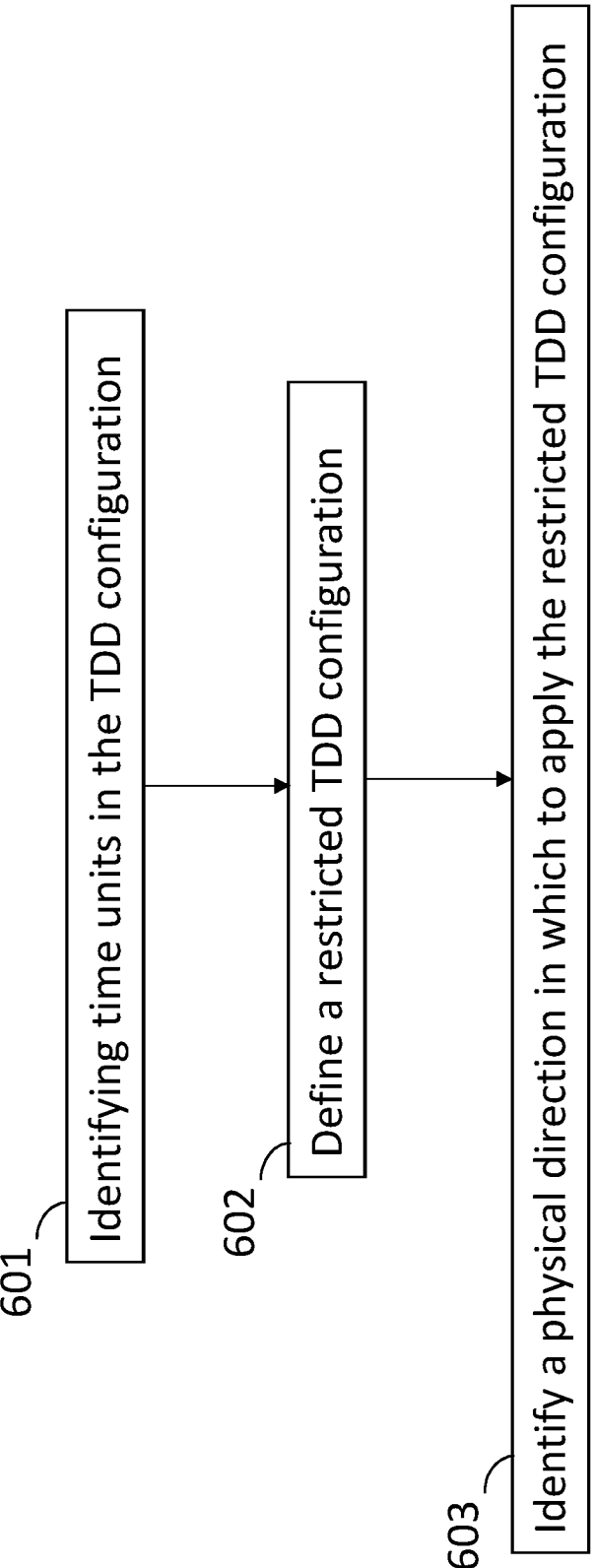
FIG. 6 is a flowchart of methods according to embodiments.

FIG. 6 shows method steps of embodiments disclosed herein. The method is performed by a network node (200) and purpose of the method is to reduce the impact of crosslink interference on transmissions between a wireless device (300) and a network node (200). The wireless device is configured with a certain TDD configuration in the cell, for example one of the configurations in Table 1 or Table 2. The wireless device may experience CLI from another neighbouring wireless device operating in a neighbouring cell using another TDD configuration. For example, one wireless device may belong to a cell configured with uplink-downlink configuration 2 in Table 1 and the neighbouring wireless device may belong to a cell configured with uplink-downlink configuration 3 in Table 1. TDD configurations are divided into different time units for at least downlink, DL, and uplink, UL, transmission, and therefore the wireless device can either receive or transmit in a time unit. A time unit may have the length of a subframe, a slot and/or a symbol. The time unit is in some embodiments a time period, for example 1 ms. In the illustrative embodiments subframe, slot and symbol may be interchangeably used. Although some illustrative embodiments are disclosed for slot time unit, the embodiments are also applicable to symbol time unit or subframe time unit.

In step 601 the network node identifies time units in the TDD configuration. The identification of a time unit is based on whether the time unit has a different configuration compared to the time unit in the another TDD configuration used in the neighbouring cell. The network node assigns time units in a TDD configuration to one of at least two time unit groups. The assignment of a time unit to a time unit group is based on the TDD configurations that are used in the serving cell and in at least one neighbouring cell. The TDD configuration can be interchanged between the network nodes (200) by signalling through the core network (120) or service network (130). The TDD configuration and time units experiencing CLI can also be identified by measuring radio quality of performance per time unit.

Figure 7:
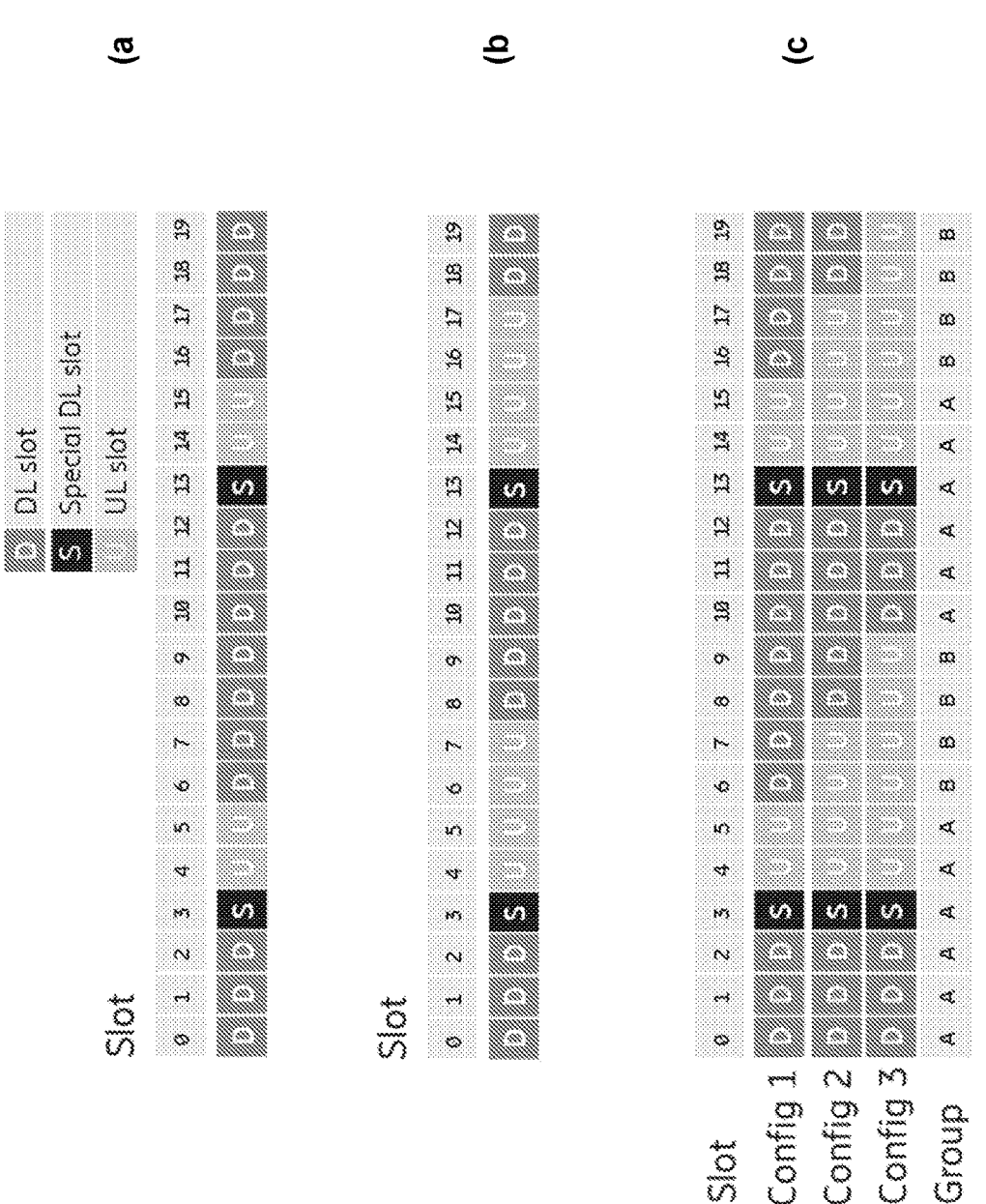
FIG. 7 shows which time-units in a TDD configurations that are identified as not to be used.

In an exemplary embodiment it is assumed a first NR TDD slot configuration for 30 kHz sub-carrier spacing as shown in FIG. 7a. The TDD configuration includes DL slots (D), UL slots (U), and special DL slots (S). This could represent the TDD configuration used by the serving cell and a wireless device. Another exemplary TDD configuration with more uplink slots is shown in FIG. 7b. This TDD configuration could represent the TDD configuration used in the neighbouring cell by the neighbouring wireless device. In the exemplary embodiment of FIG. 7 the network node would identify slots {6, 7, 16, 17} because these slots have a different configuration compared to the slots in the another TDD configuration used in the neighbouring cell. Slots {0, 1, 2, 3, 4, 5, 8, 9, 10, 11, 12, 13, 14, 15, 18, 19} would not be identified because in these slots the TDD configurations are the same in the cell and in the neighbouring cell.

If at least one of the networks/cells is configured for side-link communication, with some slots dedicated for side-link transmissions, this may also be accounted for in step 601 where slots that may encounter CLI are identified. In this context, slots dedicated to side-link transmission may be treated as uplink slots. For example, if slot 10 in FIG. 7a is used for side-link communication instead of downlink transmission and the configuration shown in FIG. 7b is used by a neighboring cell, it is identified in step 601 to be included in the restricted TDD pattern as slot 10 in the configuration shown in FIG. 7b is configured for downlink transmission.

In step 602 a restricted TDD configuration is defined by the network node for use in the cell. The restricted TDD configuration may leave the identified time units unused, for example, the restricted TDD configuration excludes transmission in the identified time units. No control data or data is transmitted in the unused time units slots {6, 7, 16, 17} whereas in the slots {0, 1, 2, 3, 4, 5, 8, 9, 10, 11, 12, 13, 14, 15, 18, 19} both control data and data can be transmitted.

Figure 11:
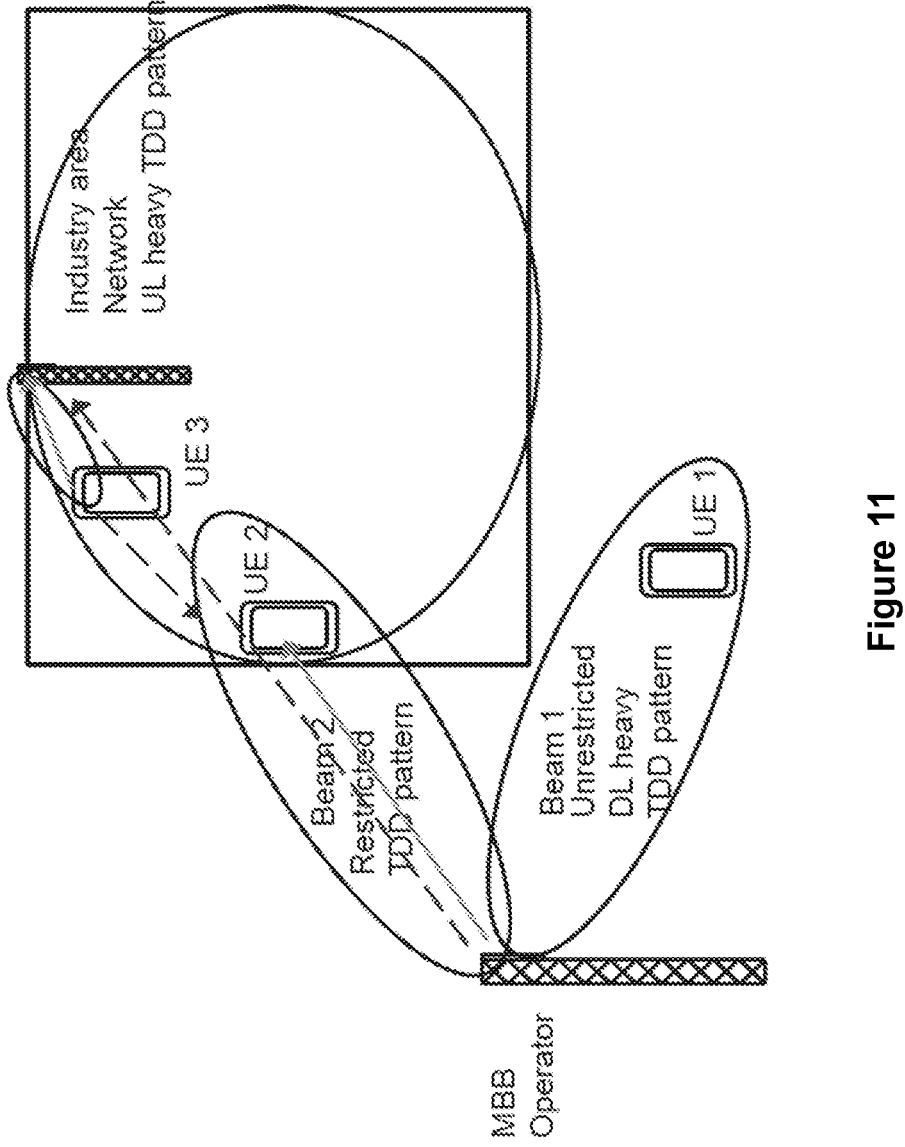
FIG. 11 illustrative shows embodiments disclosed herein.

In step 603 the network node identifies a physical direction in which to apply the restricted TDD configuration. Identifying a physical direction in which to apply the restricted TDD configuration may include identifying a beam in which to apply the restricted TDD configuration. The direction may be defined by a pointing of beam, closest angle beam in GoB, coverage angle of beam and a null point in beam shape. The beam may be a transmission beam in a beamforming multi-antenna radio. The beam may also be a combination of one or more beams in a Grid-of-Beams (GoB), or a beam-shape formed using analogue phase shift or digital precoding beamforming. Further in some embodiment the beam is formed by a directive antenna. In one embodiment MU-MIMO antenna is used by the network and where several beams can be transmitted in different directions in the same time unit FIG. 11 shows an exemplary embodiment where the restricted TDD configuration is applied to selected beams. UE 2 is served by the MBB operator in a cell through a gNB. UE 2 is initially outside the industry area network, which is served through another gNB in another cell. When UE 2 moves into the industry area it will be in proximity of UEs served by the industry area network. In FIG. 11 the solid arrows represent signals to/from the serving gNBs, while the dashed arrows represents possible CLI. CLI may be present both in the reception of the uplink transmission by the gNB in the industry area network and in the reception of the downlink transmission by UE 2. The MBB operator network, which may have nationwide coverage, is typically configured with a TDD pattern for DL heavy MBB service. On the other hand, a industry area network, which may be a local network having a more limited geographical coverage compared to the MBB operator network, may be configured with a TDD pattern for UL heavy services, such as for example uplink video. To avoid CLI in UE2 the restricted TDD pattern is used when communicating through beams covering the industry area, such as Beam 2. UE 2 is located close to U3 which is served by the industry area network and transmitting mostly in the uplink to the gNB serving the industry area network. UE 1 is outside the industry area and communicating over Beam 1, UE 1 can therefore continue using the DL heavy TDD pattern without restrictions because it does not experience CLI from the UEs in the industry area network. UE 2 will experience more CLI than UE 1. The restricted TDD configuration is not applied in the direction of UE1, i.e. the TDD configuration is not applied to Beam 1.

The transmission point (TRP) to TRP interference from the nationwide network to the industry network may also be avoided using restricted TDD configuration, e.g. the downlink slot transmission from the MBB operator, served through the gNB, is not transmitted in the direction of the industry area where the industry area network gNB receives uplink transmission.

The solution can be applied by all operators with spectrum allocation on the same band for both the public nation-wide network and a local non-public network, e.g. covering an industry area. Operators operating on adjacent frequencies can apply restricted TDD pattern for beams covering an uplink heavy industry area served by an adjacent operator's frequency band. The solution is applicable to all standards, such as LTE or NR, using TDD with flexibility to configure at least two different uplink-downlink configurations.

The use of the restricted TDD pattern and beams/directions can be adaptive and time varying. For example, it is possible to choose which network or gNB that should use the restricted TDD pattern, either in a fixed or a dynamic way. If the UL heavy network is assumed to always have higher load than the DL heavy MBB network, then the MBB network should use the restricted TDD pattern for any beams/directions that may cause CLI. On the other hand, if the load of the MBB network is always higher than the industry area network, then the industry area network should use the restricted TDD pattern. Another alternative is to dynamically select which network that should use the restricted TDD pattern based on known service time or load. It can also be communicated between the networks or detected as perceived interference or amount of communication errors.

Figure 8:
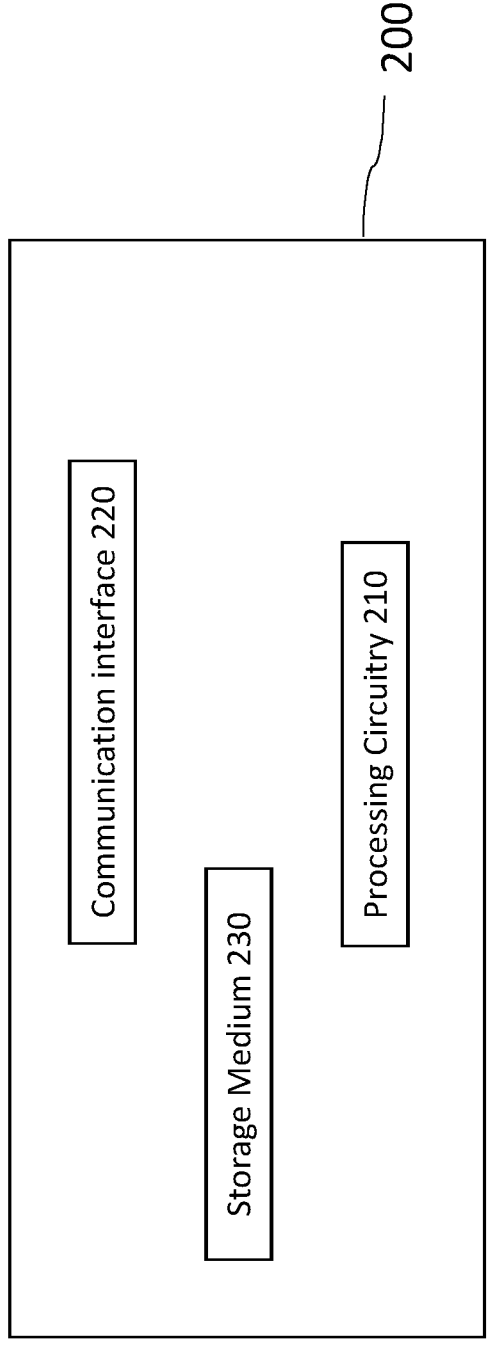
FIG. 8 is a schematic diagram showing functional units of a network node according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 10), e.g. in the form of a storage medium 230 or memory. The processing circuitry 210 may further be provided as at least one application specific integrated circuit (ASIC), or field programmable gate array (FPGA).

Particularly, the processing circuitry 210 is configured to cause network node 200 to perform a set of operations, or steps, 601-602, as disclosed above. For example, the storage medium or memory 230 may store the set of operations, and the processing circuitry 210 may be configured to retrieve the set of operations from the storage medium 230 to cause network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Network node 200 may further comprise a communications interface 220 at least configured for communications with other nodes, device, functions, and notes of the communications network 100a. As such the communications interface 220 may comprise one or more transmitters and receivers, comprising analogue and digital components. Signals could be transmitted from, and received by, a network node 200 using the communications interface 220.

The processing circuitry 210 controls the general operation of network 200 e.g. by sending data and control signals to the communications interface 220 and the storage medium 230, by receiving data and reports from the communications interface 220, and by retrieving data and instructions from the storage medium 230. Other components, as well as the related functionality, of network node 200 are omitted in order not to obscure the concepts presented herein.

Figure 9:
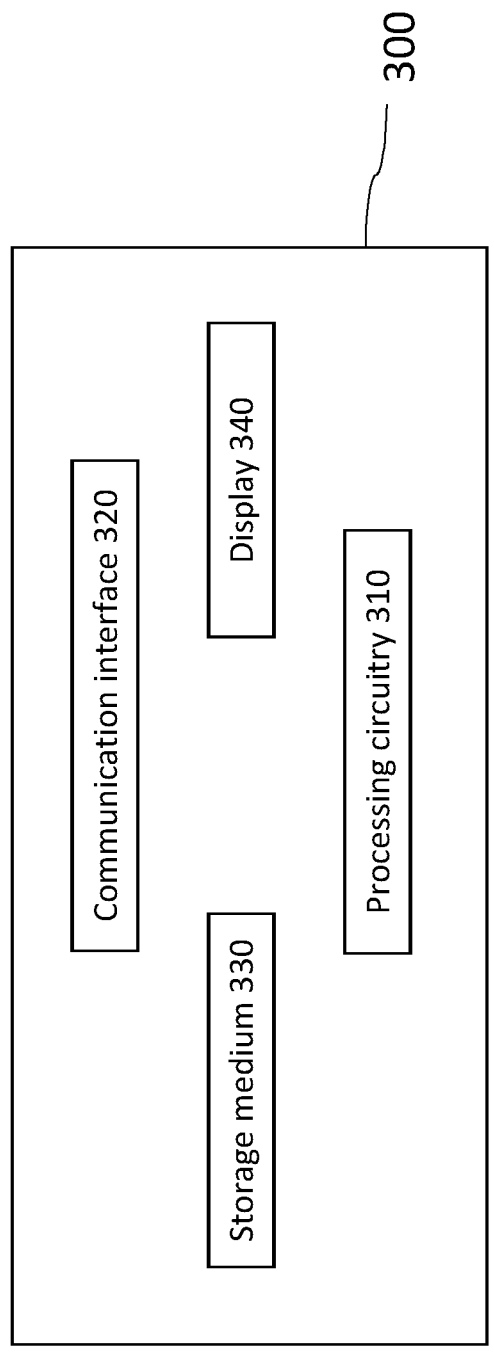
FIG. 9 is a schematic diagram showing functional units of a user equipment according to an embodiment.

FIG. 9 schematically illustrates, in terms of a number of functional units, the components of a wireless device (UE) 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910 (as in FIG. 10), e.g. in the form of a storage medium 330 or memory. The processing circuitry 310 may further be provided as at least one application specific integrated circuit (ASIC), or field programmable gate array (FPGA).

Particularly, the processing circuitry 310 is configured to cause UE 300 to perform a set of operations as disclosed above. For example, the storage medium or memory 330 may store the set of operations, and the processing circuitry 310 may be configured to retrieve the set of operations from the storage medium 330 to cause UE 300 to perform the set of operations. The set of operations may be provided as a set of executable instructions.

Thus the processing circuitry 310 is thereby arranged to execute methods as herein disclosed. The storage medium 330 may also comprise persistent storage, which, for example, can be any single one or combination of magnetic memory, optical memory, solid state memory or even remotely mounted memory. UE 300 may further comprise a communications interface 320 at least configured for communications with other nodes, device, functions, and notes of the communications network 100a. As such the communications interface 320 may comprise one or more transmitters and receivers, comprising analogue and digital components. Signals could be transmitted from, and received by, a UE 300 using the communications interface 320.

The processing circuitry 310 controls the general operation of UE 300 e.g. by sending data and control signals to the communications interface 320 and the storage medium 330, by receiving data and reports from the communications interface 320, and by retrieving data and instructions from the storage medium 330. Optionally the UE may include a display 340 but the embodiments herein are not limited thereto. Other components, as well as the related functionality, of UE 300 are omitted in order not to obscure the concepts presented herein.

Figure 10:
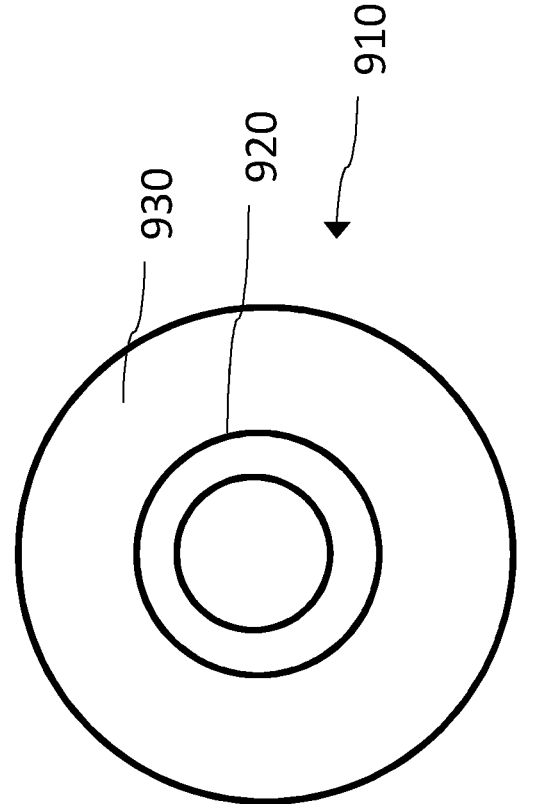
FIG. 10 shows one example of a computer program product comprising computer readable storage medium according to an embodiment.

FIG. 10 shows one example of a computer program product 910 comprising computer readable storage medium 930. On this computer readable storage medium 930, a computer program 920 can be stored, which computer program 920 can cause the processing circuitry 210 or 310 and thereto operatively coupled entities and devices, such as the communications interface 220 or 320 and the storage medium 230 or 330, to execute methods according to embodiments described herein. The computer program 920 and/or computer program product 910 may thus provide means for performing any steps as herein disclosed.

In the example of FIG. 8, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method in a network node for reducing impact of interference in a cell from at least another neighbouring cell, the cell operating using a time division duplex, TDD, configuration, and the neighbouring cell operating using another TDD configuration, the TDD configurations being divided into different time units, which are configured for at least downlink, DL, or uplink, UL, the method comprising:

identifying time units in the TDD configuration, the identification of a time unit being based on whether the time unit has a different configuration compared to the time unit in the another TDD configuration used in the neighbouring cell;

defining a restricted TDD configuration for use in the cell, the restricted TDD configuration excluding transmission in the identified time units; and identifying a physical direction in which to apply the restricted TDD configuration, the identifying the physical direction comprising identifying a beam in which to apply the restricted TDD configuration, the beam being a transmission beam in a beamforming multi-antenna radio.

2. The method according to claim 1, wherein the TDD configuration in the cell and the another TDD configuration in the neighbouring cell are synchronized in time.

3. The method according to claim 1, where the identification of time units in the TDD configuration comprises identifying time units that have a DL, or UL, configuration different from the DL, or UL, of the another TDD configuration.

4. The method according to claim 1, where the identification of time units in the TDD configuration comprises identifying time units experiencing cross-link interference from the neighbouring cell using the another TDD configuration.

5. The method according to claim 1, where time units configured for side-link communication are treated as time units configured for uplink.

6. The method according to claim 1, wherein the cell is part of a Mobile Broadband, MBB, operator network and the another cell is part of a local area network, non-public network or industry area network.

7. The method according to claim 1, where the time units are the time units for at least one of sub-frames, slots and symbols.

8. The method according to claim 1, where the network node is a base station or a user equipment (UE).

9. The method according to claim 1, where the network node and a wireless device operate in the cell using the TDD configuration, and another network node and another wireless device operate in the neighbouring cell using the another TDD configuration.

10. A network node, configured to reduce impact of interference in a cell from at least another neighbouring cell, the cell operating using a time division duplex, TDD, configuration, and the neighbouring cell operating using another TDD configuration, the TDD configurations being divided into different time units, which are configured for at least downlink, DL, or uplink, UL, transmissions, network node comprising:

a processing circuitry and a memory for storing program code that is executed by the processing circuitry to:

identify time units in the TDD configuration, the identification of a time unit being based on whether the time unit has a different configuration compared to the time unit in the another TDD configuration used in the neighbouring cell;

define a restricted TDD configuration for use in the cell, the restricted TDD configuration excluding transmission in the identified time units; and identify a physical direction in which to apply the restricted TDD configuration, the identifying the physical direction comprising identifying a beam in which to apply the restricted TDD configuration, the beam being a transmission beam in a beamforming multi-antenna radio.

11. The network node according to claim 10, wherein the TDD configuration in the cell and the another TDD configuration in the neighbouring cell are synchronized in time.

12. The network node according to claim 10, where the identification of time units in the TDD configuration comprises identifying time units that have a DL, or UL, configuration different from the DL, or UL, of the another TDD configuration.

13. The network node according to claim 10, where the identification of time units in the TDD configuration comprises identifying time units experiencing cross-link interference from the neighbouring cell using the another TDD configuration.

14. The network node according to claim 10, where time units configured for side-link communication are treated as time units configured for uplink.

15. The network node according to claim 10, wherein the cell is part of a Mobile Broadband, MBB, operator network and the another cell is part of a local area network, non-public network or industry area network.

16. The network node according to claim 10, where the network node is a base station or a user equipment (UE).

17. The network node according to claim 10, where the network node and a wireless device operate in the cell using the TDD configuration, and another network node and another wireless device operate in the neighbouring cell using the another TDD configuration.

18. A non-transitory computer storage medium storing a computer program for reducing impact of interference in a cell from at least another neighbouring cell, the cell operating using a time division duplex, TDD, configuration, and the neighbouring cell operating using another TDD configuration, the TDD configurations being divided into different time units for at least downlink, DL, and uplink, UL, transmissions, the computer program comprising computer code which, when run on processing circuitry causes a network node to:

identify time units in the TDD configuration, the identification of a time unit being based on whether the time unit has a different configuration compared to the time unit in the another TDD configuration used in the neighbouring cell;

define a restricted TDD configuration for use in the cell, the restricted TDD configuration excluding transmission in the identified time units; and identify a physical direction in which to apply the restricted TDD configuration, the identifying the physical direction comprising identifying a beam in which to apply the restricted TDD configuration, the beam being a transmission beam in a beamforming multi-antenna radio.

* * * * *